2,738,275

LACTALBUMIN COMPOSITION

Richard J. Block, Scarsdale, N. Y., assignor to The Borden Company, a corporation of New Jersey No Drawing. Application July 2, 1952,
Serial No. 296,949

4 Claims. (Cl. 99—19)

Ordinary lactalbumin is prepared from whey by heating the whey (skimmed milk from which the casein has been removed) to a temperature of about 100° C. whereupon the lactalbumin comes down as a rather gritty precipitate. This material is highly hydrophobic and if suspended in water quickly settles. It is insoluble in the water, because it is heat denatured at said temperature.

I have discovered that if lactalbumin is combined with a small percentage of a hydrophilic colloid of a type having an affinity for lactalbumin, the hydrophobic qualities of the lactalbumin are changed and a powder is obtained which when suspended in water does not settle after many weeks time.

The hydrophilic colloids having a chemical structure such that they are compatible with and have an affinity for the lactalbumin include gelatin, the natural alginates as obtained from seaweed and the like, the alkali and alkaline earth caseinates and the alkali salts of soy protein. While these various bodies are sufficiently related and equivalent so all of them will serve the purpose, I find that gelatin is the most valuable material to use and therefore in describing this invention I refer to the use of gelatin. However, it is understood that the other materials specified may be used in place of the gelatin.

In carrying out the invention the gelatin preferably in dry form is combined with the lactalbumin preferably in the moist form in which it is produced as a filter cake. The two ingredients are worked together on a mill of the general type used for rubber compounding in which a shearing, pressing action occurs. Various types of such mills are well-known in the trade, of which the simplest is a roller mill. The gelatin and lactalbumin are worked together until the gelatin has thoroughly dispersed throughout the mass of lactalbumin. When the combining is completed the gelatin coats the particles of lactalbumin and this coating is more than a mere physical covering-up and may be described as a loose type of bonding. In any event, when the mixture is put in water, except for a small amount of gelatin which may be present in the free state, the gelatin is not washed away from the lactalbumin and the dispersed material will stay in suspension for at least three days, which is a long enough test period to indicate that my type of combination has taken place. Actually the suspension will usually last several weeks.

The amount of gelatin employed may vary widely. For example based on the weight of the lactalbumin filter cake which ordinarily will contain from about 30% solids, the gelatin may range from about 0.1%–4% on the dry basis. If too much gelatin is used, the excess will simply be dissolved and wash away. From a commercial point of view ordinarily 2% on a dry weight basis is sufficient and certainly there is no point in using more than 4%.

This invention may be readily understood from the following example:

Lactalbumin cake produced in regular production had total solids of 30.7%. 1000 grams of this material was mixed in 20 grams of 3–A United States edible gelatin, the mixing being done by hand as uniformly as possible. This mixture was milled on a pilot plant size 3-roll mill. Cooling water was run into the mill rolls so that the roll temperatures were maintained at about 60° F. The milling rate was adjusted so that approximately 300 grams per minute of lactalbumin came off the No. 3 roll. The resulting product was dispersible in water and at the end of three weeks there was still a good suspension.

As a basis for comparison similar lactalbumin was stirred into a gelatin solution and after being thoroughly agitated was dried. This resulted in the lactalbumin particles being coated with gelatin. When this material was put in a quantity of water the gelatin quickly washed off and the lactalbumin settled rapidly and was all settled in less than an hour.

This appears to indicate that under the shearing, pressing action of the mill some form of chemical combination took place between the lactalbumin and the gelatin. In any event, a new water-dispersible form of lactalbumin was produced.

When other types of equivalent material are used in place of gelatin, they may be used in the same proportions as the gelatin and may be substituted directly for it in the example given.

What I claim is:

1. The method of preparing a water dispersible combination of heat denatured hydrophobic lactalbumin and a hydrophilic colloid selected from the group consisting of gelatin, natural alginates, the alkali and alkaline earth caseinates and the alkali salts of soy protein, which comprises mixing about .2% to about 4% of such colloid on a dry weight basis with the lactalbumin and subjecting the mixture to the action of a shearing, pressing type of milling this type of milling combining the heat denatured lactalbumin and the said colloid into a combination from which the colloid is not dissolved by simple water washing.

2. The method of preparing a water-dispersible combination of heat denatured, hydrophobic lactalbumin and gelatin which comprises mixing about 0.2% to about 4% of gelatin on a dry weight basis with the lactalbumin and subjecting them to the action of a shearing, pressing type of milling, this type of milling combining the heat denatured lactalbumin and the said gelatin into a combination from which the gelatin is not dissolved by simple water washing.

3. As a new product, heat denatured, hydrophobic lactalbumin combined with from .2 to 4% on a dry weight basis of a hydrophilic colloid selected from the group consisting of gelatin, natural alginates, the alkali and alkaline earth caseinates and the alkali salts of soy protein, such product being characterized by the fact that it is readily dispersible in water and the said colloid is not dissolved from the heat denatured lactalbumin by simple washing with water.

4. As a new product, heat denatured, hydrophobic lactalbumin combined with from 0.2 to 4% on a dry weight basis of gelatin, such product being characterized by the fact that it is readily dispersible in water and the gelatin is not dissolved from the combination with the heat denatured lactalbumin by simple washing with water.

References Cited in the file of this patent

UNITED STATES PATENTS

| | | |
|---|---|---|
| 735,149 | Ramage | Aug. 4, 1903 |
| 2,171,428 | Griffith et al. | Aug. 29, 1939 |
| 2,568,369 | Scholz | Sept. 18, 1951 |
| 2,602,746 | Meade | July 8, 1952 |
| 2,623,038 | Scott | Dec. 23, 1952 |